United States Patent [19]

Cartwright et al.

[11] Patent Number: 5,637,636
[45] Date of Patent: Jun. 10, 1997

[54] SILICAS

[75] Inventors: Simon Cartwright, Merseyside; Ian P. McKeown, Liverpool; Peter W. Stanier, Cheshire, all of United Kingdom

[73] Assignee: Crosfield Limited, Warrington, United Kingdom

[21] Appl. No.: 433,506

[22] PCT Filed: Nov. 3, 1993

[86] PCT No.: PCT/EP93/03093

§ 371 Date: Jun. 15, 1995

§ 102(e) Date: Jun. 15, 1995

[87] PCT Pub. No.: WO94/11302

PCT Pub. Date: May 26, 1994

[30] Foreign Application Priority Data

Nov. 12, 1992 [EP] European Pat. Off. ............. 92310348

[51] Int. Cl.$^6$ .................... C08K 3/36; C01B 33/187
[52] U.S. Cl. ................. 524/493; 524/494; 523/216; 523/218; 523/220; 423/335; 423/338; 423/339
[58] Field of Search ................... 524/494, 493; 523/220, 216, 218; 423/335, 339, 338

[56] References Cited

U.S. PATENT DOCUMENTS

| | | | |
|---|---|---|---|
| 4,127,641 | 11/1978 | Aldcroft et al. | 423/339 |
| 4,251,281 | 2/1981 | Machurat et al. | 423/339 |
| 4,526,910 | 7/1985 | Das et al. | 523/220 |
| 4,738,838 | 4/1988 | Shinpo et al. | 423/339 |
| 5,123,964 | 6/1992 | Kerner et al. | 423/335 |
| 5,447,704 | 9/1995 | Alderoft et al. | 423/339 |

FOREIGN PATENT DOCUMENTS

| | | |
|---|---|---|
| 341383 | 11/1989 | European Pat. Off. . |
| 442325 | 8/1991 | European Pat. Off. . |

OTHER PUBLICATIONS

Chemical Abstracts, vol. 94, No. 6, Feb. 9, 1981, abstract No. 33070s, p. 144, & JP,A,80 113 611, Sep.2, 1980.
Chemical Abstracts, vol. 94, No. 6, Feb. 9, 1981, abstract No. 33064t, p. 144, & JP,A,80 116 613, Sep.8, 1980.
Chemical Abstracts, vol. 94, No. 6, Feb. 9, 1981, abstract No. 33068x, p. 144, & JP,A,80 116 614, Sep.8, 1980.

*Primary Examiner*—Paul R. Michl
*Assistant Examiner*—Olga Asinovsky
*Attorney, Agent, or Firm*—Cushman Darby & Cushman IP Group Pillsbury Madison & Sutro LLP

[57] ABSTRACT

An amorphous silica has a pore size distribution wherein 90% of the pores have a diameter above 15 nanometers, and less than 20% of the pore volume is in pores having a pore diameter between 10 and 20 nanometers, the amorphous silica having a CTAB surface area of less than 100 m$^2$/g, the amorphous silica having a matting efficiency of below 20 gloss units at an incidence angle of 60° and a loading of 5% by weight. It can be prepared by a precipitation route. It is used in thixotropic paints and lacquers.

3 Claims, No Drawings

SILICAS

TECHNICAL FIELD OF THE INVENTION

The invention relates to silicas, a process for manufacturing these silicas and the use of these silicas as matting agents in thixotropic paints, varnishes and lacquers.

BACKGROUND OF THE INVENTION

Silica gels, usually referred to as xerogels in the dried form, are versatile materials for industrial purposes and find uses, particularly in the milled and/or micronised state in which controlled particle size distributions can be produced, as a matting agent in paint and lacquer systems.

It is common for paints and varnishes to be structured by the incorporation of a thixotropic medium. Such paints and varnishes can have the advantages of being dripless, easy to apply, prevent pigment settlement and can be put on vertical surfaces at high film thickness without sagging.

Resins prepared from alkyds and polyamides are frequently used as the main binder component in thixotropic alkyd coatings and thixotropic alkyd resins are commercially manufactured by, for example, Cray Valley Products under the name of Gelkyds.

The degree of thixotropy present in a paint or varnish can be controlled by the level of thixotropic alkyds utilised. They can be incorporated on their own or in combination with a conventional liquid resin to give complete formulation flexibility. The range of the resultant paints and varnishes can therefore span from highly structured (dripless) to only lightly structured (gel or viscous liquid).

It is often desirable to produce thixotropic paints or varnishes in matt, semi-matt or eggshell finishes, by the incorporation of a suitable silica. Unfortunately, this causes partial or total loss of the thixotropy depending upon the type of silica which is used.

Some silicas, such as Gasil 200 (obtainable from Joseph Crosfield & Sons) prove to have no significant negative effects on thixotropy but, in other respects they are not suitable as matting agents. In contrast, silicas based upon gel technology such as HP200 series products (obtainable from Joseph Crosfield & Sons) prove to be good matting agents but adversely affect the thixotropy.

Up to now two solutions have been proposed which can be summarised as follows.

As a first solution, the matting agent is a standard silica and the thixotropic system is formulated to minimize negative interactions. Thixotropic alkyds manufacturers have used this solution by eliminating the random nature of the hydrogen bonding present in conventional thixotropic alkyd resins and produced so-called Super-Gelkyds which are tolerant to polar groups. However such products have drawbacks in terms of delivery and handling since they have non melting characteristics and cannot be supplied in mobile form in tankers. These products can also be sensitive to high shear rates.

As a second solution, instead of reformulating the thixotropic system, the matting agent is modified in order to minimize its interactions with the thixotropic system. EP-A-442325 (Grace Gmbh) describes a silica flatting agent which is purported to be used in thixotropic polyamide-modified alkyd resins with no negative effect on their thixotropic behaviour. This is allegedly achieved by adding 1 to 25% by weight of a polyol to a silica. This solution therefore requires an additional processing step.

Thus, there is a need for a silica which exhibits good matting properties whilst not adversely affecting the thixotropic nature of the thixotropic system to which it is added.

It is therefore a first goal of the present invention to provide a silica with good matting properties that does not adversely affect the thixotropic behaviour of thixotropic paints and lacquers based on polyamide-modified alkyd resins.

It is a second goal of the present invention to provide a process for manufacturing such silica.

It is a third goal of the present invention to provide thixotropic paints and lacquers based on polyamide-modified alkyd resins with a silica matting agent.

It has now been found that a silica with a specific pore size distribution and with a specific matting efficiency can be used as a matting agent in thixotropic paints and lacquers based on polyamide-modified alkyd resins without adversely affecting the thixotropic behaviour of the system.

SUMMARY OF THE INVENTION

It is a first object of the present invention to provide an amorphous silica having a pore size distribution wherein 90% of the pores have a diameter above 15 nanometers, and less than 20% of the pore volume is in pores having a pore diameter between 10 and 30 nanometers, the amorphous silica having a CTAB surface area of less than 100 m$^2$/g, the amorphous silica having a matting efficiency of below 20 gloss units at an incidence angle of 60° and a loading of 5% by weight in a thixotropic modified alkyd paint system.

It is a second object of the present invention to provide a process for manufacturing an amorphous silica wherein, in a first step, sulphuric acid is added to, or mixed with, a sodium silicate solution having a SiO2:Na2O ratio of between 3.1 and 3.4 to form a slurry, after this first step the degree of neutralisation being between 50% and 88% and the SiO2 concentration being between 6.5% and 7.5% by weight, the temperature of the slurry being maintained below 100° C. and above 85° C., sulphuric acid being afterwards added to reach a pH of about 4, the resulting silica being then washed and dried.

It is a third object of the present invention to provide thixotropic paints and lacquers based on polyamide-modified alkyd resins, with a silica matting agent wherein the silica matting agent is an amorphous silica having a pore size distribution wherein 90% of the pores have a diameter above 15 nanometers, and less than 20% of the pore volume is in pores having a pore diameter between 10 and 30 nanometers, the amorphous silica having a CTAB surface area of less than 100 m$^2$/g, the amorphous silica having a matting efficiency of below 20 gloss units at an incidence angle of 60° and a loading of 5% by weight in a thixotropic modified alkyd paint system.

Definitions and test procedures i. Nitrogen surface area—pore volume

Nitrogen surface area is determined by standard nitrogen adsorption methods of Brunauer, Emmett and Teller (BET) using a multi point method with an ASAP 2400 apparatus supplied by Micromeritics of the U.S.A. The samples are outgassed under vacuum at 270° C. for at least one hour before measurement. Surface area is calculated from the volume of nitrogen gas adsorbed at p/po 0.98. This apparatus also provides the pore size distribution from which it is possible to get the pore size ($D_{10}$) for which 10% of the pores are below this pore size. In the same manner, it is possible to get the pore size for which 50% ($D_{50}$) and 90% ($D_{90}$) of the pores are below this pore size. Additionally the pore volume (cm$^3$/g) for a given range of pore size can be obtained from the desorption curve.

ii. Matting efficiency

The matting efficiency of a silica flatting agent is determined by dispersing the silica in a polyamide-modified alkyd resin, drawing a film on a glass plate, and allowing to air dry at room temperature in a dust free atmosphere. The plates are then measured for matting efficiency at 60° and 85° incidence angle using a BYK multi glossmeter.

| Formulation of thixotropic resin | |
|---|---|
| | Parts by weight |
| Rutile Titania | 28.4 |
| Synolac 60W (*) | 22.1 |
| Gelkyd 320W (*) | 39.0 |
| White spirit | 9.3 |
| 1.0% Calcium carboxylate | 0.7 |
| 12% Cobalt octoate | 0.2 |
| 24% Zirconium carboxylate | 0.2 |
| Methyl ethyl ketoxime | 0.9 |

(*) Synolac 60W and Gelkyd 320W can be obtained from Cray Valley Products.

This formulation, in the absence of silica matting agent, gave gloss readings of 82 and 92 at angles of incidence of 60° and 85° respectively. The viscosity of this formulation was 20,768 mPa.s at 24 sec$^{-1}$ and 25° C.

The test resin contains a weight percent (3% or 5%) of the silica matting agent as defined in each example.

Into an 8 oz (250 cm$^3$) glass jar weigh 47.5 g of thixotropic resin (formulation above). Using a glass rod stir into the paint an appropriate weight of silica until the powder completely wets out. Following complete wetting stir the system at 1500 rpm for two minutes using a Heidolph stirrer (fitted with a Cowles type head). Draw a film onto a black glass plate (12"×4") using a 100 µm block applicator and allow to air dry at room temperature, in a dust free atmosphere, over a period of 24 hours.

Assess the matting efficiency (expressed in gloss units) by reading at 60° and 85° incidence angle using a BYK multi glossmeter.

iii. Degree of neutralisation (DofN)

Knowing the quantity of sodium silicate which is to be neutralised it is possible to calculate the quantity of acid which is needed to complete the neutralisation. The degree of neutralisation must be understood as being the percentage of the required amount of acid which has been introduced at the end of the first acid addition.

iv. Thixotropy—viscosity

The viscosity of a thixotropic resin, and a silica flatted thixotropic resin, is determined after pre conditionning of the system at 55°–60° C., to provide a consistent shear history for the systems. The pre conditionned samples are then allowed to stand for 24 hours at 25° C. and are measured at 25° C. using a Haake viscometer fitted with a 1° cone and plate.

The formulation of polyamide modified thixotropic alkyd resin is summarised in section (ii) (Matting efficiency).

The flatted resin contains 5% by weight of silica with respect to the weight of the thixotropic formulation.

Into a 60 cm$^3$ screw cap jar weigh 47.5 g of the thixotropic resin. Heat the resin to 55°–60° C. and using a glass rod stir in 2.5 g of silica flatting agent until the powder is fully wetted.

Store the flatted system at 25° C. for 24 hours, after which the viscosity can be determined using a Haake viscometer. The viscometer (Haake RV 12) is fitted with a PK 100 sensor system, an M 150 measuring head and a PK 1, 1° cone.

A flow curve is determined (at 25° C.) one minute after loading the sample by applying an increasing shear rate, from 0 to 324 sec$^{-1}$, over a two minute period. The viscosity is calculated at 24 sec$^{-1}$ from this increasing rate curve.

The viscosity of the formulation in the absence of silica matting agent was 20,768 mPa.s v. Weight mean particle size The weight mean particle size is determined with the aid of a Malvern Mastersizer using 45 mm path length lens. This instrument, made by Malvern Instruments, Worcestershire uses the principle of Fraunhoffer diffraction utilising a low power He/Ne laser. Before measurement the sample was dispersed ultrasonically in water for a period of 7 minutes to form an aqueous suspension. The Malvern Mastersizer measures the weight particle size distribution of the silica. The weight mean particle size ($d_{50}$), the 10 percentile ($d_{10}$) and the 90 percentile ($d_{90}$) are easily obtained from the data generated by the instrument.

vi. CTAB surface area

This method determines the specific surface area of samples, exclusive of area contained in micropores too small to admit hexadecyltrimethyl ammonium bromide (cetyltrimethyl ammonium bromide, commonly referred to as CTAB) molecules.

The isotherm for adsorption of an aqueous solution of CTAB at a charged surface has a long horizontal plateau corresponding to a bilayer coverage of the substrate surface. Rapid equilibration is achieved by using mechanical agitation. Titration with sodium dodecyl sulphate solution is used to determine the unadsorbed CTAB after removal of the dispersed silica by centrifugation.

Into a 50 cm$^3$ screw-cap jar weight between 0.10 and 0.25 g of silica, depending upon surface area to be determined. For high surface areas, which lead to low CTAB titrations, the lower weight is employed. Add 25 cm$^3$ of 0.01 mol.dm$^{-3}$ CTAB solution and bring the pH of the mixture to 9.0 with 0.1 mol.dm$^{-3}$ NaOH solution. Stopper the jar and agitate for 1 hour in a water bath set at 25° C. Settle the suspension centrifugally and transfer 5 cm$^3$ of the supernatant into a 50 cm$^3$ measuring cylinder. Add 10 cm$^3$ of deionised water, 15 cm$^3$ of chloroform, 10 cm$^3$ of mixed indicator solution (dimidium bromide/disulphine blue obtainable from BDH Ltd, Poole, Dorset, England) and titrate with 0.005 mol.dm$^{-3}$ sodium dodecyl sulphate solution, previously calibrated by a standard CTAB solution. The titration end point is that point at which the chloroform layer becomes pale-pink. Record the volume of sodium dodecyl sulphate to reach the end point as $V_2$ cm$^3$. Conduct a blank titration in a similar manner on 5 cm$^3$ of the stock CTAB solution and record the volume of sodium dodecyl sulphate as $V_1$ cm$^3$.

Calculate the CTAB surface per gram of silica by the following equation in which the calculation is based on a molecular cross section of the bromide of 35 Å$^2$:

$$CTAB \text{ Surface area} = \frac{(V_1 - V_2) \times 5.27}{W} \times (0.5)$$

Where W=Weight of silica samle (in grams) 0.5 accounts for bi-layer formation.

SPECIFIC DESCRIPTION OF THE INVENTION

The invention is further illustrated but not limited by the following examples wherein percentages are in weight unless otherwise specified.

Example 1

A heated stirred reaction vessel was used for the silicate/acid reacton.

Mixing is an important feature in the reaction of silicate and sulphuric acid. Consequently fixed specifications as listed in Chemineer Inc. Chem Eng. Apr. 26, 1976 pages 102–110 have been used to design the baffled heated stirred reaction vessel. Whilst the turbine design is optional to the mixing geometry, a 6-bladed 30° pitched bladed unit has been chosen for the experiments in order to ensure maximum mixing effectiveness with minimum shear.

The solutions used in this Example were as follows:
i) Sodium silicate solution having a SiO2:Na2O ratio of 3.29:1 and a SiO2 content of 17.2% by weight.
ii) A sulphuric acid solution of specific gravity of 1.12.

No electrolyte solution was added.

13.6 liters of water was placed in the vessel together with 0.12 liters of sodium silicate solution. This mixture was then stirred and heated to 98° C.

11.4 liters of sodium silicate and 4.8 liters of sulphuric acid were then added simultaneously over a period of 20 minutes with stirring whilst maintaining the temperature at 98° C. The flow rates of the silicate and acid solutions were uniform throughout the addition period to ensure that a constant pH of 10 was maintained in the vessel.

Silicate slurry was then aged at pH 10 for 50 minutes at 98° C.

Sulphuric acid was then added over a period of 10 minutes to give a final slurry pH of 4.

The resultant slurry was then filtered and washed with water to remove excess electrolyte, dried and micronised.

Example 2

The same reaction vessel, with the same stirrer, was used as in Example 1.

The solutions used in this Example were as follows:
i) Sodium silicate solution having a SiO2:Na2O ratio of 3.29:1 and a SiO2 content of 16.75% by weight.
ii) A sulphuric acid solution of specific gravity of 1.13.
iii) 3.8 liters of a 25% (w/w) sodium chloride solution.

13.6 liters of water was placed in the vessel together with 11.3 liters of sodium silicate solution. This mixture was then stirred and heated to 98° C.

4.89 liters of sulphuric acid was then added over a period of 20 minutes with stirring whilst maintaining the temperature at 98° C. The acid flow rate of the acid solution was uniform throughout the addition period. The final pH after the acid addition was 9.

3.8 liters of a 25% (w/w) sodium chloride solution was then added over 18 minutes, the temperature being maintained at 98° C.

Sulphuric acid was then added over a period of 10 minutes to give a final slurry pH of 4.

The resultant slurry was then filtered and washed with water to remove excess electrolyte, dried and micronised.

Example 3

The same reaction vessel, with the same stirrer, was used as in Example 1.

The solutions used in this Example were as follows:
i) Sodium silicate solution having a SiO2:Na2O ratio of 3.29:1 and a SiO2 content of 17.2% by weight.
ii) A sulphuric acid solution of specific gravity of 1.12.

13.6 liters of water was placed in the vessel together with 11.5 liters of sodium silicate solution. This mixture was then stirred and heated to 98° C.

4.84 liters of sulphuric acid was then added over a period of 20 minutes with stirring whilst maintaining the temperature at 98° C. The acid flow rate of the acid solution was uniform throughout the addition period. The final pH after the acid addition was 11.

The slurry was then aged over a period of 20 minutes at a temperature of 98° C.

Sulphuric acid was then added over a period of 10 minutes to give a final slurry pH of 4.

The resultant slurry was then filtered and washed with water to remove excess electrolyte, dried and micronised.

Example 4

A larger reaction vessel than the one used in Example 1 but with the same configuration of the vessel geometry, baffles and stirrer was used.

The solutions used in this Example were as follows:
i) Sodium silicate solution having a SiO2:Na2O ratio of 3.28:1 and a SiO2 content of 16.62% by weight.
ii) A sulphuric acid solution of specific gravity of 1.12.
iii) 40 liters of a 25% (w/w) sodium chloride solution.

83.5 liters of water was placed in the vessel together with 80.2 liters of sodium silicate solution. This mixture was then stirred and heated to 98° C.

27.96 liters of sulphuric acid was then added over a period of 20 minutes with stirring whilst maintaining the temperature at 98° C. The acid flow rate of the acid solution was uniform throughout the addition period.

40 liters of a 25% (w/w) sodium chloride solution was then added over 15 minutes, the temperature being maintained at 98° C.

Sulphuric acid was then added over a period of 10 minutes to give a final slurry pH of 4.

The resultant slurry was then filtered and washed with water to remove excess electrolyte, dried and micronised.

Example 5

The same reaction vessel, with the same stirrer, was used as in Example 1.

The solutions used in this Example were as follows:
i) Sodium silicate solution having a SiO2:Na2O ratio of 3.25:1 and a SiO2 content of 17.1% by weight.
ii) A sulphuric acid solution of specific gravity of 1.13.
iii) 4.0 liters of a 25% (w/w) sodium chloride solution.

13.35 liters of water was placed in the vessel together with 11.6 liters of sodium silicate solution. This mixture was then stirred and heated to 98° C.

5.03 liters of sulphuric acid was then added over a period of 20 minutes with stirring whilst maintaining the temperature at 98° C. The acid flow rate of the acid solution was uniform throughout the addition period.

4.0 liters of a 25% (w/w) sodium chloride solution was then added over 18 minutes, the temperature being maintained at 98° C.

The slurry was then aged during 10 minutes at 98° C.

Sulphuric acid was then added over a period of 10 minutes to give a final slurry pH of 4.

The resultant slurry was then filtered and washed with water to remove excess electrolyte dried and micronised.

The physical properties of Examples 1 to 5 are summarised in the following Table 1 wherein:

S.A.=Surface Area to nitrogen ($m^2/g$)

P.V.=Total Pore Volume to nitrogen ($cm^3/g$) (of pores with pore diameter between 1.7 and 300 nm)

P.V.(10–30)=Pore Volume to nitrogen of pores having a diameter between 10 and 30 nm. ($cm^3/g$)

$$X = 100 \times \frac{P.V.(10-30)}{P.V.}$$

Pore size distribution: $D_{10}$, $D_{50}$, $D_{90}$ in nanometers as above defined in "Definitions and Test procedures" section i).

M.E. at 60°=Matting efficiency at 60° at 5% loading (in gloss units)

M.E. at 85°=Matting efficiency at 85° at 5% loading (in gloss units)

V.=viscosity (mPa.s)

$d_{10}$, $d_{50}$, $d_{90}$=percentiles of the particle size distribution (microns) after drying and micronization, S=Surface Area to CTAB ($m^2/g$)

NM means that the parameter was not measured

TABLE 1

| Example | 1 | 2 | 3 | 4 | 5 |
|---|---|---|---|---|---|
| S.A. (m²/g) | 177 | 209 | 215 | 230 | NM |
| P.V. (cm³/g) | 1.09 | 1.31 | 0.91 | 1.78 | NM |
| P.V. (10–30) (cm³/g) | 0.13 | 0.20 | 0.16 | 0.19 | NM |
| X | 11.9 | 15.4 | 17.6 | 10.7 | NM |
| S (m²/g) | 55 | 82 | 77 | 74 | 70 |
| $D_{10}$ (nm) | 22 | 21 | 16 | 28 | NM |
| $D_{50}$ (nm) | 60 | 50 | 50 | 60 | NM |
| $D_{90}$ (nm) | >100 | >100 | >100 | >100 | NM |
| M.E. at 60° | 15 | 6 | 6 | 11 | 7 |
| M.E. at 85° | 36 | 10 | 10 | 26 | 12 |
| V. (mPa·s) | 18638 | 18638 | 14910 | 20235 | 14378 |
| $d_{10}$ (μm) | 2.6 | 3.7 | 4.0 | 3.0 | 4.1 |
| $d_{50}$ (μm) | 5.8 | 7.4 | 7.6 | 6.9 | 7.1 |
| $d_{90}$ (μm) | 12.8 | 14.9 | 14.3 | 14.6 | 20.3 |

Example 6

A number of preparations have been made, altering the temperature, the percentage SiO2 of the sol after the first acid addition, the Degree of Neutralization, the NaCl:SiO2 ratio and the ageing time in order to identify the key process variables controlling thixotropy and matting.

Preparations are based upon a sol volume of 30 liters, the sol consisting of water, sodium silicate and first acid addition. The method of addition being according to Example 2 or 5 depending on the presence of an ageing step of 10 minutes.

The results are summarised in the following Table 2 wherein.

$SiO_2$(%) represents the $SiO_2$ concentration in percent by weight at the end of the first acid addition, DofN represents the Degree of Neutralization, NaCl:$SiO_2$ represents the weight ratio of NaCl and $SiO_2$, M.E. at 60°=Matting efficiency at 60° at 3% loading (in gloss units), M.E. at 85°=Matting efficiency at 85° at 3% loading (in gloss units), V.=viscosity (mPa.s)

$d_{10}$, $d_{50}$, $d_{90}$=percentiles of the particle size distribution (microns) after drying and micronization.

S=Surface Area to CTAB (m²/g)

Nm means that the parameter was not measured,

TABLE 2

| Sample | 1 | 2 | 3 | 4 | 5 | 6 |
|---|---|---|---|---|---|---|
| Temperature (°C.) | 80 | 80 | 80 | 80 | 80 | 80 |
| $SiO_2$(%) | 6.6 | 6.6 | 6.6 | 7.3 | 7.3 | 7.3 |
| 10 minutes Ageing | No | No | Yes | No | No | Yes |
| DofN (%) | 70 | 84 | 70 | 70 | 84 | 70 |
| NaCl:$SiO_2$ | 0.5:1 | 1:1 | 1:1 | 1:1 | 0.5:1 | 0.5:1 |
| $d_{10}$ (μm) | 2.7 | 4.2 | 4.6 | 4.5 | 3.1 | 3.1 |
| $d_{50}$ (μm) | 4.8 | 8.5 | 8.6 | 9.1 | 5.9 | 5.6 |
| $d_{90}$ (μm) | 15.8 | 19.2 | 16.5 | 19.4 | 12.0 | 10.9 |
| M.E. 60° | 22 | 20 | 13 | 12 | 20 | 21 |
| M.E. 80° | 52 | 32 | 20 | 16 | 45 | 55 |
| S (m²/g) | NM | NM | 150 | 116 | 134 | NM |
| Viscosity (mPa·s)(*) | 7455 | <3000 | <3000 | <3000 | <3000 | <3000 |

| Sample | 7 | 8 | 9 | 10 | 11 | 12 |
|---|---|---|---|---|---|---|
| Temperature (°C.) | 80 | 88 | 88 | 98 | 98 | 98 |
| $SiO_2$(%) | 7.3 | 7.0 | 7.0 | 6.6 | 6.6 | 6.6 |
| 10 minutes Ageing | Yes | No | No | No | Yes | Yes |
| DofN (%) | 84 | 84 | 84 | 70 | 70 | 84 |
| NaCl:$SiO_2$ | 1:1 | 0.5:1 | 1:1 | 1:1 | 0.5:1 | 1:1 |
| $d_{10}$ (μm) | 3.8 | 3.8 | 2.7 | 3.9 | 3.5 | 3.2 |
| $d_{50}$ (μm) | 8.0 | 8.0 | 4.8 | 9.7 | 9.6 | 6.6 |
| $d_{90}$ (μm) | 16.9 | 16.9 | 8.2 | 25.9 | 27.7 | 13.7 |
| M.E. 60° | 18 | 22 | 19 | 23 | 37 | 15 |
| M.E. 80° | 36 | 55 | 56 | 46 | 64 | 42 |
| Viscosity (mPa·s)(*) | <3000 | 18638 | 18105 | 17040 | 18638 | 12780 |

| Sample | 13 | 14 | 15 | 16 | 17 | 18 |
|---|---|---|---|---|---|---|
| Temperature (°C.) | 98 | 98 | 98 | 98 | 98 | 98 |
| $SiO_2$(%) | 7.0 | 7.0 | 7.3 | 7.3 | 7.3 | 7.3 |
| 10 minutes Ageing | No | No | No | No | Yes | Yes |

TABLE 2-continued

| | | | | | | |
|---|---|---|---|---|---|---|
| DofN (%) | 70 | 84 | 70 | 84 | 70 | 84 |
| NaCl:SiO$_2$ | 1:1 | 0.5:1 | 0.5:1 | 1:1 | 1:1 | 0.5:1 |
| d$_{10}$ (µm) | 1.2 | 3.7 | 4.5 | 3.2 | 4.1 | 4.1 |
| d$_{50}$ (µm) | 5.3 | 7.4 | 11.0 | 6.0 | 9.5 | 7.1 |
| d$_{90}$ (µm) | 11.9 | 14.9 | 27 | 10.6 | 21.0 | 20.3 |
| M.E. 60° | 48 | 14 | 23 | 15 | 19 | 21 |
| M.E. 80° | 81 | 30 | 31 | 38 | 26 | 37 |
| Viscosity (mPa · s) | 31950 | 18638 | 17040 | 14910 | 18105 | 14378 |

(*)in the above table, the thixotropy of the preparation was completely destroyed in preparation 2, 3, 4, 5, 6, 7, and the viscosity was below 3000 mPa · s.

(*)—in the above table, the thixotropy of the preparation was completely destroyed in preparation 2, 3, 4, 5, 6, 7, and the viscosity was below 3000 mPa.s.

It can be seen that, none of the samples prepared at 80° C. combine good retention of thixotropy with satisfactory matting efficiency.

In other respects the samples prepared at a temperature of 88° and 98° C. combine a good retention of thixotropy with a satisfactory matting efficiency. It can be noticed from the above data that working at a temperature above 85° C. the viscosity of the system is always maintained to a significant level even though, for highly thixotropic systems, a viscosity of 13,500 mPa.s is considered as the lower acceptable figure. That means that it is possible to produce a thixotropic paint or lacquer with a matting agent wherein the viscosity is reduced by less than 35% whereas the matting efficiency is less than 20 gloss units at an incidence angle of 60° and a loading of 5% by weight in a thixotropic modified alkyd paint system.

The percentage of SiO2 after the first acid addition has to be below 7.5 and above 6.5% otherwise the matting efficiency as well as the thixotropy can be dramatically affected.

Comparative Example 1

An amorphous silica (Gasil 200 obtainable from Joseph Crosfield & Sons) with a small pore size distribution ($D_{10}$=2.5 nm, $D_{50}$=2.8 nm, $D_{90}$=12.0 nm) was tested as a matting agent in a thixotropic paint.

The particle size distribution was as follows:

$d_{10}$=1.8 µm $d_{50}$=4.2 µm $d_{90}$=8.0 µm

The matting efficiency as well as the influence on thixotropy were assessed according to the above described methods.

The results were as follows.

| Matting efficiency: | Angle | |
|---|---|---|
| Loading | 60 | 85 |
| 3% | 79 | 94 |
| 5% | 74 | 93 |
| Viscosity: | | 15000 mPa · s |

It is apparent that this silica has no significant detrimental effect on thixotropy but cannot be used as a matting agent because of its poor matting efficiency.

Comparative Example 2

Another amorphous silica (HP210 obtainable from Joseph Crosfield & Sons) with a wide pore size distribution ($D_{10}$=12.0 nm, $D_{50}$=19.0 nm, $D_{90}$=27.0 nm) was also tested as in comparative Example 1.

The product is widely used as a matting silica and has the following particle size distribution:

$d_{10}$: 2.9 (µm)

$d_{50}$: 6.5 (µm)

$d_{90}$: 11.0 (µm)

The results were as follow.

| Matting efficiency: | Angle | |
|---|---|---|
| Loading | 60 | 85 |
| 5% | 8 | 21 |

Viscosity: <3000 mPa.s (non thixotropic)

Although this silica gives a very good matting efficiency, it totally destroys the thixotropy of the system.

We claim:

1. Amorphous silica having a pore size distribution wherein 90% of the pores have a diameter above 15 nanometers, and less than 20% of the pore volume is in pores having a pore diameter between 10 and 30 nanometers, the amorphous silica having a CTAB surface area of less than 100 m$^2$/g, the amorphous silica having a matting efficiency of below 20 gloss units at an incidence angle of 60° and a loading of 5% by weight.

2. In a thixotropic paint or lacquer based on a thixotropic polyamide-modified alkyd resin, containing a silica matting agent, the improvement wherein the matting agent is an amorphous silica having a pore size distribution wherein 90% of the pores have a diameter above 15 nanometers, and less than 20% of the pore volume is in pores having a pore diameter between 10 and 30 nanometers, the amorphous silica having a CTAB surface area of less than 100 m$^2$/g, the amorphous silica having a matting efficiency of below 20 gloss units at an incidence angle of 60° C. and a loading of 5% by weight, said silica providing the matting effect without adversely affecting the thixotropic nature of the polyamide-modified alkyd resin.

3. In a thixotropic paint or lacquer containing a matting agent, the improvement wherein the matting agent is an amorphous silica according to claim 1, said matting agent reducing the viscosity of said paint or lacquer by less than 35% and providing a matting efficiency of less than 20 gloss units at an incidence angle of 60° and a loading of 5% by weight.

* * * * *